United States Patent
Bhattacharjya

(10) Patent No.: US 7,333,628 B2
(45) Date of Patent: Feb. 19, 2008

(54) DATA EMBEDDING WITH MULTI-LEVEL SCREENING

(75) Inventor: Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 906 days.

(21) Appl. No.: 10/645,957

(22) Filed: Aug. 22, 2003

(65) Prior Publication Data
US 2005/0041833 A1    Feb. 24, 2005

(51) Int. Cl.
*G06K 9/00*   (2006.01)
*G06K 15/00*  (2006.01)
*G09C 3/00*   (2006.01)

(52) U.S. Cl. .................... 382/100; 380/54; 713/176; 358/3.28

(58) Field of Classification Search .......... None
See application file for complete search history.

(56) References Cited

U.S. PATENT DOCUMENTS

| | | | |
|---|---|---|---|
| 5,790,703 A | 8/1998 | Wang | |
| 5,859,920 A | 1/1999 | Daly et al. | |
| 6,226,387 B1 | 5/2001 | Tewfik et al. | |
| 6,252,971 B1 * | 6/2001 | Wang | 382/100 |
| 6,400,827 B1 | 6/2002 | Rhoads | |
| 6,456,726 B1 | 9/2002 | Yu et al. | |
| 7,148,999 B2 * | 12/2006 | Xu et al. | 358/3.06 |
| 7,197,161 B2 * | 3/2007 | Fan | 382/100 |

* cited by examiner

*Primary Examiner*—Bhavesh M Mehta
*Assistant Examiner*—Charles Kim

(57) ABSTRACT

Digital data is rapidly embedded in color/grayscale digital data by switching between a set of multi-level screens or quantizers. Each screen can be tuned to maximize the quality of the digital data product on the intended display medium, so that the quality of the displayed product does not suffer. The data embedding method/algorithm of the invention generally involves generating a set of multi-level screens, each of which is generated by selecting a set of colors that comprise the colors that can be output by that multi-level screen; screening the input digital medium with the generated multi-level screens using a dither matrix and a set of level matrices; and selecting, for each of select number of pixel locations in the input digital medium, one of the level matrices, based on a message symbol to be embedded at that pixel location, to create an output.

6 Claims, 8 Drawing Sheets

$$D = [d_{ij}] = \begin{bmatrix} d_{11} & d_{12} & \cdots & d_{1n} \\ d_{21} & d_{22} & \cdots & d_{2n} \\ \cdot & \cdot & \cdots & \cdot \\ \cdot & \cdot & \cdots & \cdot \\ d_{n1} & d_{n2} & \cdots & d_{nn} \end{bmatrix}$$

Fig. 2

$$C^i = \{c_m^i : m = 0, \ldots, M\text{-}1\} = \begin{cases} [c_0^0 & c_1^0 & \cdots & c_{M-1}^0] \\ [c_0^1 & c_1^1 & \cdots & c_{M-1}^1] \\ [\,\cdot & \cdot & \cdots & \cdot\,] \\ [\,\cdot & \cdot & \cdots & \cdot\,] \\ [c_0^N & c_1^N & \cdots & c_{M-1}^N] \end{cases} \nearrow 51$$

Fig. 5

$$C^i = \begin{matrix} C^0 = & [\phantom{1/}0 & 4/255 & 8/255 & \cdots & 252/255] \\ \\ C^1 = & [1/255 & 5/255 & 9/255 & \cdots & 253/255] \\ \\ C^2 = & [2/255 & 6/255 & 10/255 & \cdots & 254/255] \\ \\ C^3 = & [3/255 & 7/255 & 11/255 & \cdots & 1] \end{matrix}$$

Fig. 7

DATA EMBEDDING WITH MULTI-LEVEL SCREENING

BACKGROUND OF THE INVENTION

1. Field of the Invention

The present invention relates to a method/algorithm for embedding data in color/grayscale digital data. The method/algorithm of the present invention, which enables fast data embedding, may be embodied in an apparatus such as a computer, or as a program of instructions (e.g., software) embodied on a machine-readable medium.

2. Description of the Related Art

Digital data embedding refers to the addition of information content to a digital medium. Mathematical techniques that operate at the constructive level of the particular media are typically employed to add the information. The digital medium can take any of a variety of forms, including still digital data, audio and video. Among those forms, digital media includes various sub-categories: image, graphics, text, mixed mode, etc.

The added information content can be used for different purposes, such as to prevent tampering with the image, to identify ownership or the intended recipient of a digital image, or to detect tampering of a digital medium. What additional information is embedded and the manner in which it is embedded depend to a large extent on the purpose for which the embedded data will be used, but the basic embedding technique has been substantially the same. That is, previous data embedding methods have focused primarily on embedding data by adding a small signal to the original image data. The present invention provides a different approach to data embedding.

OBJECTS OF THE INVENTION

Accordingly, it is an object of the present invention to provide an algorithm/method to achieve data embedding by switching between screens of a set of multi-level screens or quantizers.

It is a further object of this invention to enable the algorithm/method to tune each screen, during the data embedding process, to maximize the quality of the image on the intended display medium, so that the quality of the image does not suffer.

SUMMARY OF THE INVENTION

According to one aspect of this invention a method for embedding data in an input digital medium is provided. The method generally comprises (a) generating a set of multi-level screens, each multi-level screen being generated by selecting a set of colors that comprise the colors that can be output by that multi-level screen; (b) screening the input digital medium with the generated multi-level screens using a dither matrix and a set of level matrices; and (c) selecting, for each of select number of pixel locations in the input digital medium, one of the level matrices, based on a message symbol to be embedded at that pixel location, to create an output, thereby embedding data in the input digital medium.

Preferably, the multi-level screen is generated such that, for a single color, $c_m$ color levels are selected to form an ordered set such that $c_m < c_{m+1}$. Moreover, the generating of each multi-level screen preferably comprises determining an output color corresponding to an input color c at a given pixel location in the input digital medium by finding an index r such that $c_r \leq c \leq c_{r+1}$, and performing one of the following steps. (1) Outputting $c_0$, if $c \leq c_0$; (2) outputting $c_{M-1}$, if $c \geq c_{M-1}$; or (3) computing $t=(c-c_r)/(c_{r+1}-c_r)$, if $c_0 < c < c_{M-1}$. If step (3) is performed, then it is determined if $t < d_{u\ mod\ P, v\ mod\ Q}$. If so, the method involves outputting $c_r$; if not, the method involves outputting $c_{r+1}$. Here, M represents the number of levels of that multi-level screen, $D=[d_{ij}]$ denotes the dither matrix and P×Q defines its size, and (u,v) identifies a location in the input digital medium.

Preferably, the level matrix used to create the corresponding output for each selected pixel location in the input digital medium is determined independently or as a function of the neighboring input and output colors.

In another aspect, the invention involves an apparatus for embedding data in an input digital medium. Such an apparatus comprises components appropriately configured to perform the processing described above with respect to the method. Such components may include one or more of the following: an instruction-based processor (e.g., a central processing unit (CPU)), an Application Specific Integrated Circuit (ASIC), digital signal processing circuitry, or combination thereof.

In accordance with further aspects of the invention, the above-described method or any of the steps thereof may be embodied in a program of instructions (e.g., software) which may be stored on, or conveyed to, a computer or other processor-controlled device for execution. Alternatively, the method or any of the steps thereof may be implemented using functionally equivalent hardware (e.g., ASIC, digital signal processing circuitry, etc.) or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 2 is a representation of a dither matrix designed in accordance with embodiments of the invention.

FIG. 5 is a set of level matrices, constructed in accordance with embodiments of the invention.

FIG. 7 is a specific set of level matrices (i.e., a set of multi-level screens), constructed in accordance with an embodiment of the invention.

DESCRIPTION OF THE PREFERRED EMBODIMENTS

A. The Method/Algorithm

Figure 1:
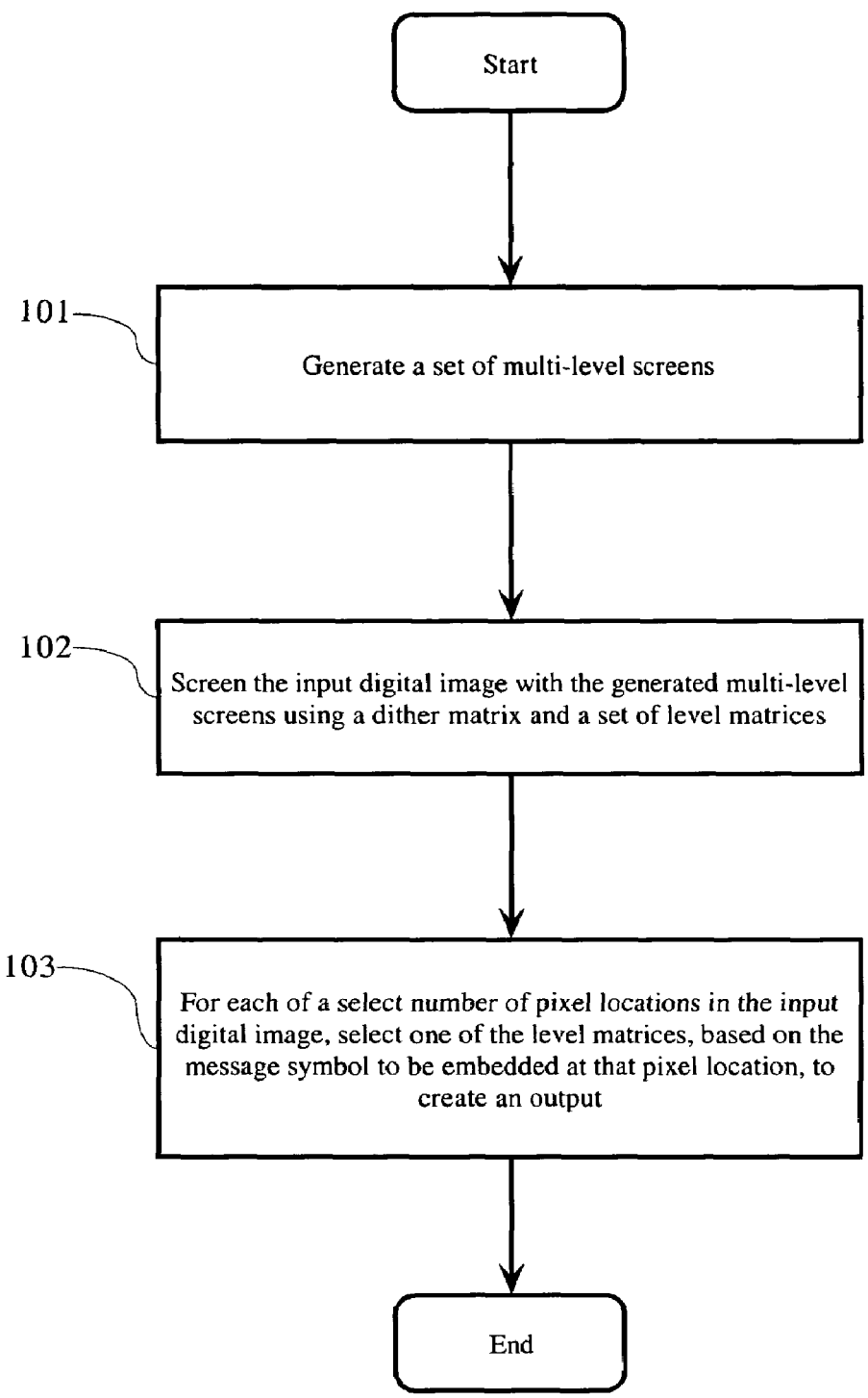
FIG. 1 is a flow diagram illustrating the basic processing steps of a algorithm/method for embedding data in a digital medium, according to embodiments of the invention.

Referring to the flow diagram of FIG. 1, the algorithm/method of the present invention is generally involves the following. First, a set of multi-level screens is generated (step 101). Each such screen is generated by selecting a set of colors that comprise the colors that can be output by that multi-level screen. Next, an input digital medium (e.g., a digital input image) is screened with the generated multi-level screens using a dither matrix and a set of level matrices (step 102). Then, for each of a select number of pixel locations in the input digital medium, one of the level matrices is selected, based on the message symbol to be embedded at that pixel location, to create an output (step 103). The input digital medium then contains embedded data in the form of message symbols embedded at the selected pixel locations. The selected number of pixels may be all of the pixels or a smaller subset.

B. Multi-Level Screening

A specific design of a multi-level screen is presented, by way of example, to demonstrate the various aspects of the invention. Referring to FIG. 2, consider a two-dimensional spatial array of thresholds forming a P×Q dither matrix 21, denoted $D=[d_{ij}]$. Without loss of generality, assume that $d_{ij} \in [0,1]$. This dither matrix 21 may be designed based on characteristics of an output device, e.g., a printer, using known techniques such as clustered, ordered, dispersed dithers, etc.

Figure 3:
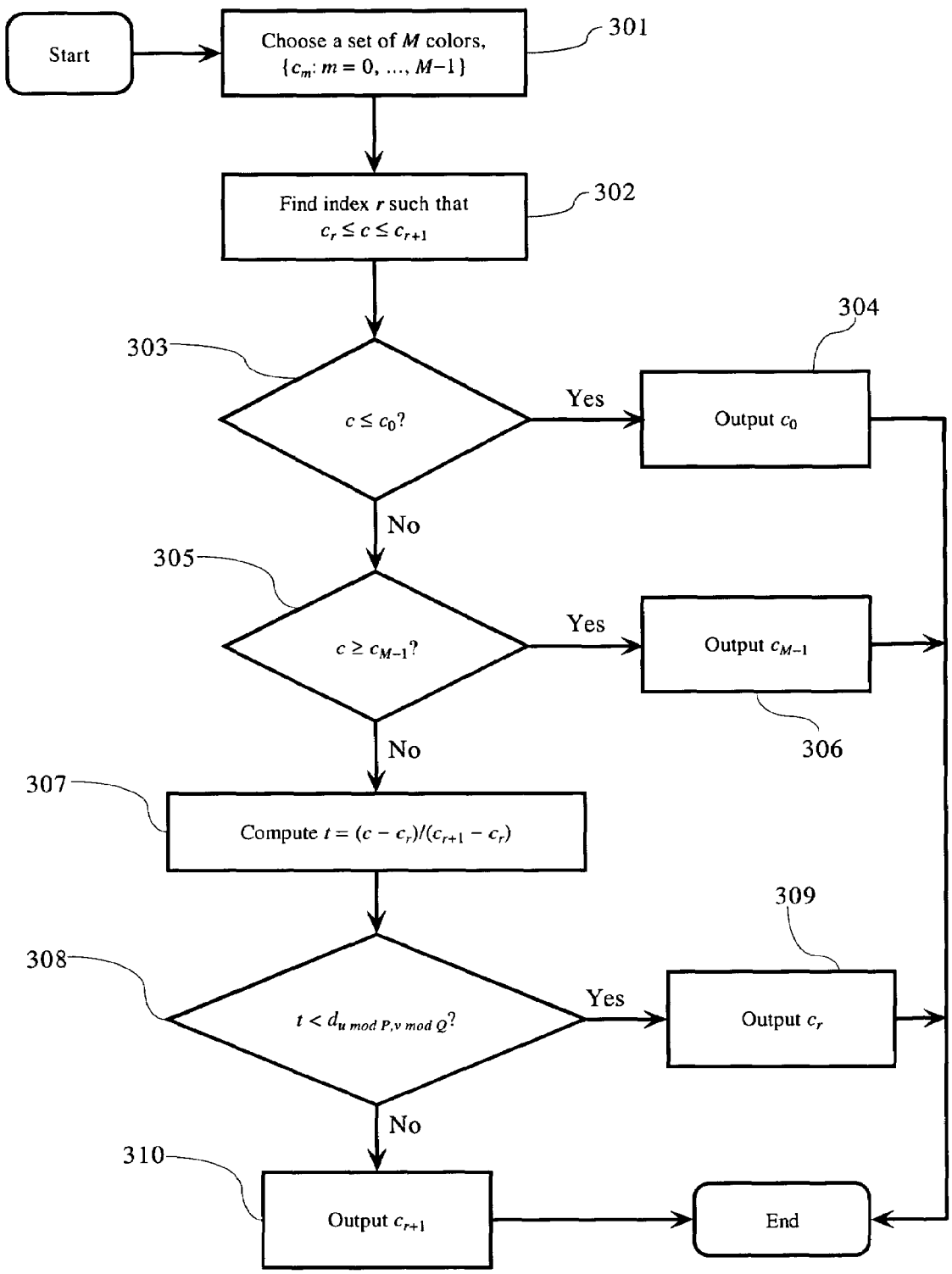
FIG. 3 is a flow diagram illustrating the design of a single-color multi-level screen, according to embodiments of the invention.

A single-color multi-level screen with M levels is designed to function as shown in the flow diagram in FIG. 3. The design starts by choosing a set of M colors, $\{c_m: m=0, \ldots, M-1\}$, that comprise the colors output by the screen (step 301). For a single color, the levels $c_m$ can be chosen to form an ordered set such that $c_m < c_{m+1}$. Without loss of generality, all colors are assumed to lie in the interval [0,1]. The output color corresponding to a color c at image location (e.g., pixel location) (u,v) (see FIG. 4) is determined as follows. Find an index r, such that $c_r \leq c \leq c_{r+1}$ (step 302). In step 303, determine if $c \leq c_0$. If so, output $c_0$ (step 304). If not, determine in step 305 if $c \geq c_{M-1}$. If so, output $c_{M-1}$ (step 306). In all other cases, that is, if the decision in step 305 is "no," compute $t=(c-c_r)/(c_{r+1}-c_r)$ in step 307. Next, in step 308, determine if $t < d_{u \bmod P, v \bmod Q}$. If so, output $c_r$ (step 309); otherwise, output $c_{r+1}$ (step 310).

C. Creating a Set of Multi-Level Screens

Figure 4:
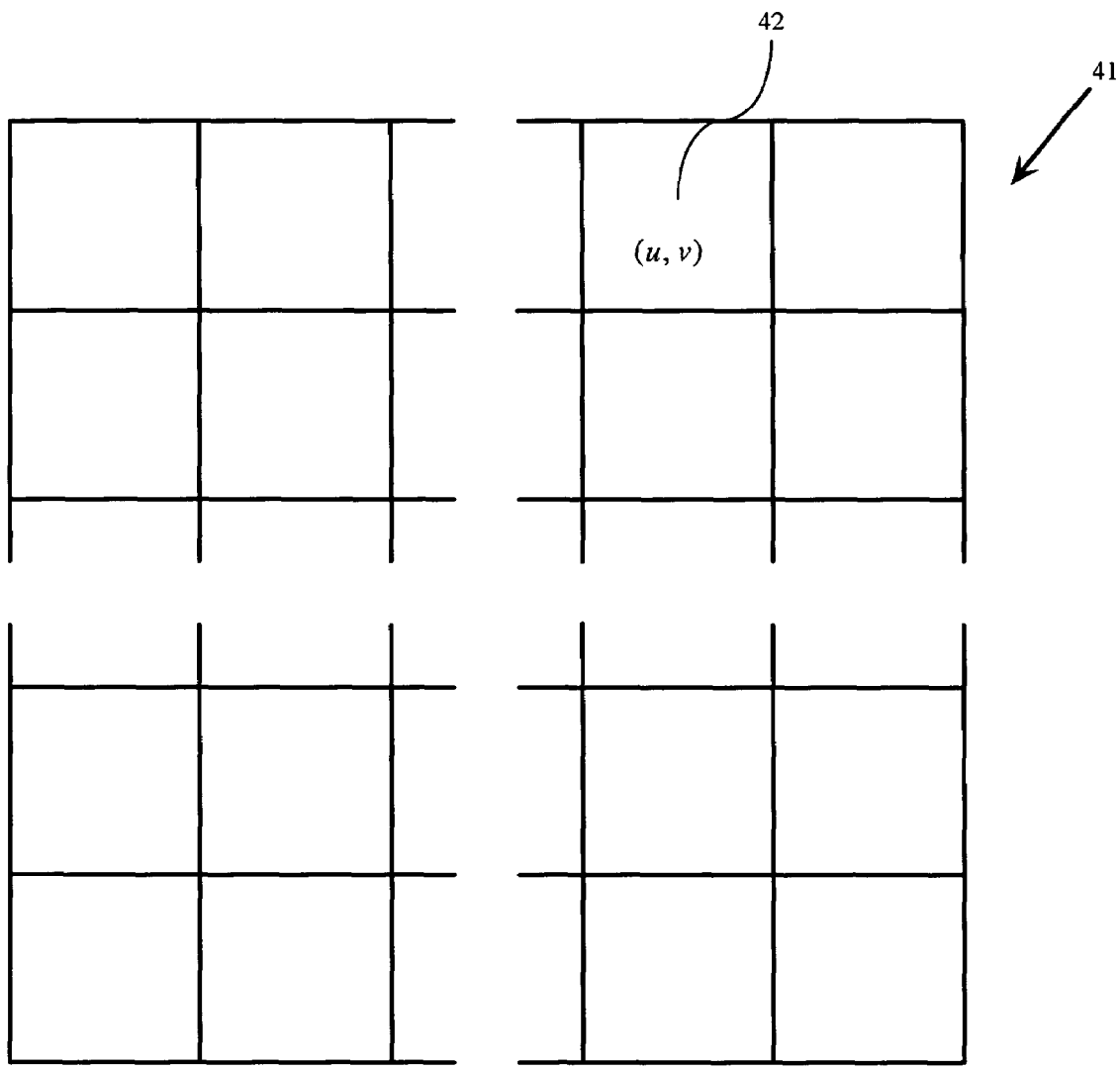
FIG. 4 is a schematic representation of an input image in which data may be embedded in accordance with embodiments of the invention.

A schematic representation of an input image 41 is shown in FIG. 4. Multi-level screens, as described above, can be used to screen such an input image 41 by using single dither matrix 21, $D=[d_{ij}]$, as shown in FIG. 2, together with a set of level matrices 51, denoted $C^i=\{c_m^i: m=0, \ldots, M-1\}$ and schematically illustrated in FIG. 5. At each image location (e.g., pixel location) 42, designated (u,v), the level matrix $C^i$ to be used to create the output may be chosen independently or as a function of the neighboring input and output colors, using color-prediction functions, or schemes such as error diffusion.

D. Using a Set of Multi-Level Screens for Data Embedding

Figure 6:
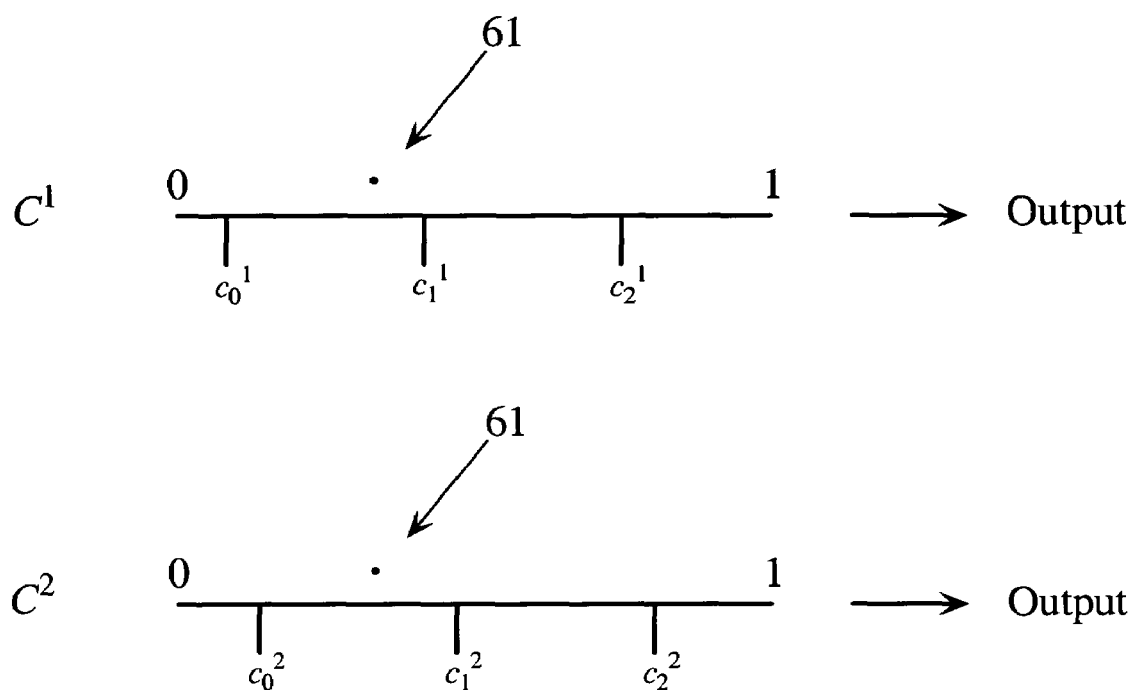
FIG. 6 is a schematic diagram of two level matrices with non-overlapping outputs.

If the level matrices $C^i$ are designed to have non-overlapping outputs, the level matrix used to generate the output at a given pixel location can be determined uniquely by examining the output color. For example, FIG. 6 shows two different level matrices, say $C^1$ and $C^2$, each having 3 color output levels between 0 and 1, i.e., M=3. The output levels of $C^1$ do not overlap those of $C^2$. For $C^1$, those levels are indicated by $c_0^1$, $c_1^1$ and $c_2^1$. For $C^2$, those levels are indicated by $c_0^2$, $c_1^2$ and $c_2^2$. For a given input color 61 that lies between $c_0^1$ and $c_1^1$ in level matrix $C^1$, a dither matrix 21 is applied between those two color levels. The same or a different dither matrix 21 is also applied between $c_0^2$ and $c_1^2$ which defines the interval in which input color 61 lies. By examining the output color corresponding to input color 61, the particular level matrix $C^1$ or $C^2$ used to create that output color can be determined.

Specifically, for an output color c, the matrix $C^i$ can be found by determining which $c_m^i$ is equal to c. If the minimum separation between the colors $c_m^i$ is $d_c$, the above scheme would also be able to tolerate noise of up to $d_c/2$, and still correctly determine $C^i$ by finding the $c_m^i$ that is closest to the noise-corrupted output color c. Thus, given N such level matrices $C^i$, it is possible to embed and recover one N—ary message symbol at each pixel location. The mapping between $C^i$ and input symbols can be changed at each pixel using a variety of schemes including schemes based on a secret key, functions of neighboring pixel values in a causal neighborhood of the given pixel, etc.

E. Example

FIG. 7 shows a set of multi-level screens for embedding a message symbol with four (4) alternatives at each location. Assume an 8-bit/pixel input image where each pixel may assume one of 256 gray levels. To embed up to four (4) symbols per pixel, four 64-level matrices $C^i$, i=0,1,2,3, would be required. Assuming that colors have been scaled to the interval [0,1], the level matrices may be selected to be:

$C^i=\{c_m^i=(4m+i)/255: m=0, \ldots, 63\}, i=0, 1, 2, 3,$
as shown in FIG. 7.

F. Extension to Color

The above scheme can easily be extended to color channels by using the same or different dither matrices for each color channel, and picking corresponding level matrices. The above-described algorithm/method is thus extended to color by replicating the same technique for each color channel. The use of different dither matrices for different color channels can be used to build requirements on the relative color-distribution patterns for each channel to minimize the perception of artifacts such as Moire patterns, or increased image noise.

Another technique would be to consider the higher dimensional color space as a single space, and use different non-overlapping color quantizers to quantize this space. Messages may now be embedded by picking different quantizers depending on the symbol to be embedded. This scheme, however, does not take into account the spatial distribution of colors (as is implicitly done in the design of the dither matrix D), and may result in more visible embedding artifacts. Such effects may be mitigated using techniques such as color error diffusion, at the expense of increased computation.

G. Implementations

Figure 8:
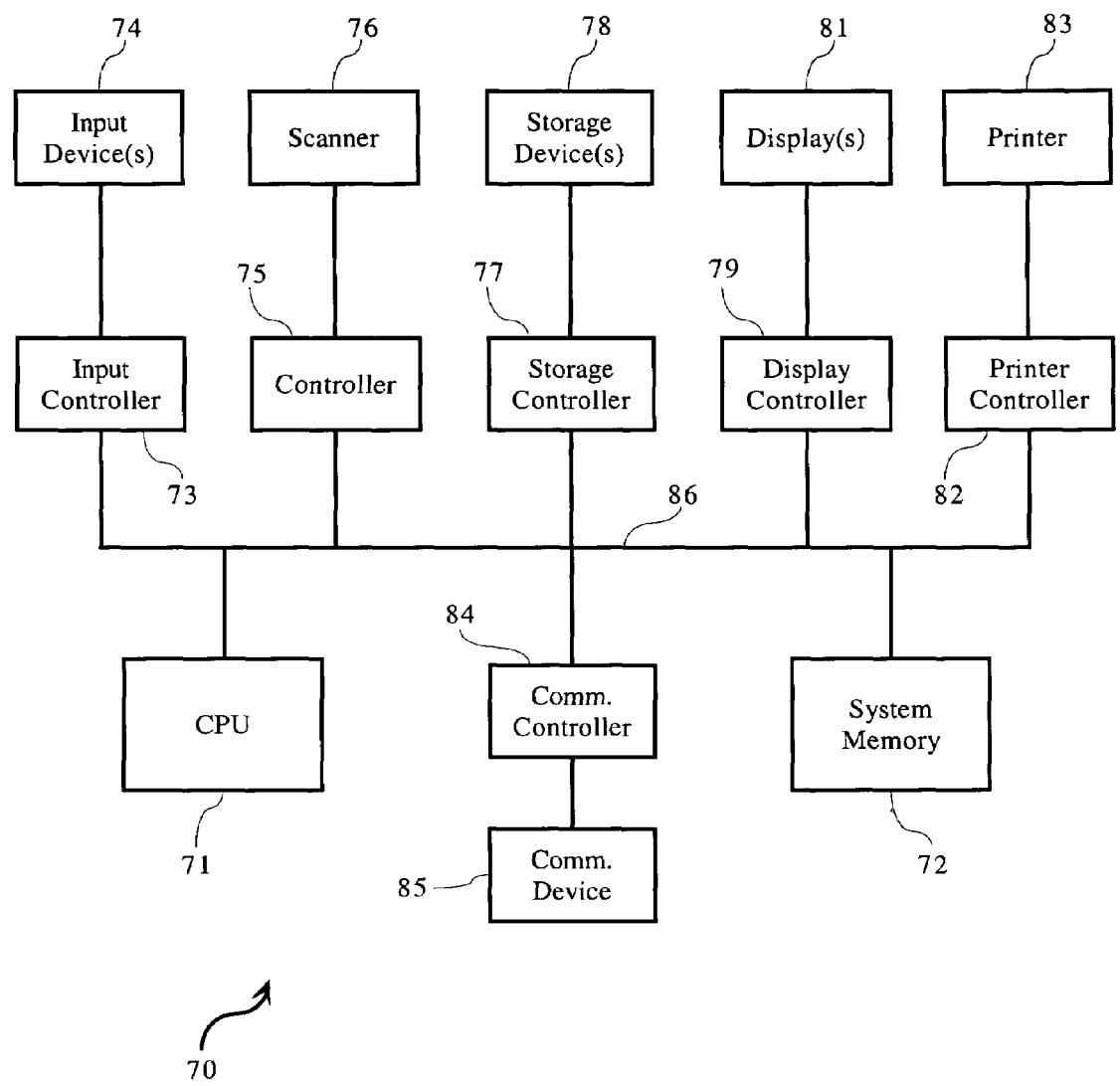
FIG. 8 is a block diagram of an exemplary image processing system which may be used to implement embodiments of the algorithm/method of the present invention.

The algorithm/method of the present invention may be conveniently implemented in software which may be run on an image processing system 70 of the type illustrated in FIG. 8. The image processing system is described below in the context of a computer with peripheral devices including a printer. This is but one example of an image processing system in which the algorithm of this invention may be incorporated. The algorithm may also be embodied in other suitable arrangements. For example, the inventive algorithm may be embodied directly in the printer. The algorithm may also be embodied in a photocopier which includes, or has access to, a processing unit.

The illustrated image processing system of FIG. 8 includes a central processing unit (CPU) 71 that provides computing resources and controls the system. CPU 71 may be implemented with a microprocessor or the like, and may also include a floating point coprocessor for mathematical computations. CPU 71 is preferably also configured to process image/graphics, video, and audio data. To this end, the CPU 71 may include one or more other chips designed specifically to handle such processing. System 70 further includes system memory 72 which may be in the form of random-access memory (RAM) and read-only memory (ROM).

Such a system 70 typically includes a number of controllers and peripheral devices, as shown in FIG. 8. In the illustrated embodiment, input controller 73 represents an interface to one or more input devices 74, such as a keyboard, mouse or stylus. There is also a controller 75 which communicates with a scanner 76 or equivalent device for digitizing documents. A storage controller 77 interfaces with one or more storage devices 78 each of which includes a storage medium such as magnetic tape or disk, or an optical medium that may be used to record programs of instructions for operating systems, utilities and applications which may include embodiments of programs that implement various aspects of the present invention. Storage device(s) 78 may also be used to store data to be processed/manipulated in accordance with the invention. A display controller 79 provides an interface to a display device 81 which may be of any known type.

In accordance with the invention, a printer controller 82 is also provided for communicating with a printer 83, which is preferably a laser printer. The processing of this invention may be embodied in the printer controller 82, e.g., the printer driver.

A communications controller 84 interfaces with a communication device 85 which enables system 70 to connect to remote devices through any of a variety of networks including the Internet, a local area network (LAN), a wide area network (WAN), or through any suitable electromagnetic carrier signals including infrared signals.

In the illustrated system, all major system components connect to bus 86 which may represent more than one physical bus.

Depending on the particular application of the invention, various system components may or may not be in physical proximity to one another. For example, the input data (e.g., the data used in creating the multi-level screens and/or the data to be embedded) and/or the output data (e.g., the multi-level screens and/or the image data containing embedded data) may be remotely transmitted from one physical location to another. Also, a program that implements various aspects of the screen design or data embedding process may be accessed from a remote location (e.g., a server) over a network. Such data and/or program(s) may be conveyed through any of a variety of machine-readable medium including magnetic tape or disk or optical disc, network signals, or any suitable electromagnetic carrier signal including an infrared signal.

While the present invention may be conveniently implemented with software, a hardware implementation or combined hardware/software implementation is also possible. A hardware implementation may be realized, for example, using ASIC(s), digital signal processing circuitry, or the like. As such, the claim language "machine-readable medium" includes not only software-carrying media, but also hardware having instructions for performing the required processing hardwired thereon, as well as a combination of hardware and software. Similarly, the claim language "program of instructions" includes both software and instructions embedded on hardware. Also, the "means" language used in the claims covers any appropriately configured processing device, such as an instruction-based processor (e.g., a CPU), ASIC, digital signal processing circuitry, or combination thereof. With these implementation alternatives in mind, it is to be understood that the figures and accompanying description provide the functional information one skilled in the art would require to write program code (i.e., software) or to fabricate circuits (i.e., hardware) to perform the processing required.

As the foregoing description demonstrates, the present invention provides an effective method/algorithm for embedding data in a digital medium by switching between a set of multi-level screens or quantizers. Advantageously, each screen is tuned to maximize the quality of the image on the intended display medium, so that the quality of the image does not suffer.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for embedding data in an input digital medium, comprising the steps of:
    (a) generating a set of multi-level screens, each multi-level screen being generated by selecting a set of colors that comprise the colors that can be output by that multi-level screen, such that, for a single color, $c_m$ color levels are selected to form an ordered set such that $c_m < c_{m+1}$;
    (b) screening the input digital medium with the generated multi-level screens using a dither matrix and a set of level matrices; and
    (c) selecting, for each of select number of pixel locations in the input digital medium, one of the level matrices, based on a message symbol to be embedded at that pixel location, to create an output, thereby embedding data in the input digital medium.

2. A method as recited in claim 1, wherein the generating of each multi-level screen in the set comprises determining an output color corresponding to an input color c at a given pixel location in the input digital medium by:
    finding an index r such that $c_r \leq c \leq c_{r+1}$; and
    performing one of the following steps:
        outputting $c_0$, if $c \leq c_0$;
        outputting $c_{M-1}$, if $c \geq c_{M-1}$; or
            computing $t=(c-c_r)/(c_{r+1}-c_r)$, if $c_0 < c < c_{m-1}$, and determining if $t < d_{u \bmod P, v \bmod Q}$, and
            outputting $c_r$, if $t < d_{u \bmod P, v \bmod Q}$, or
            outputting $c_{r+1}$, if $t \geq d_{u \bmod P, v \bmod Q}$
    wherein M represents the number of levels of that multi-level screen, $D=[d_{ij}]$ denotes the dither matrix and P×Q defines its size, and (u,v) identifies a location in the input digital medium.

3. A method as recited in claim 1, wherein, for each selected pixel location in the input digital medium, the level matrix used to create the corresponding output is selected independently or as a function of the neighboring input and output colors.

4. An apparatus for embedding data in an input digital medium, the apparatus comprising:
    generating unit that generates a set of multi-level screens, each multi-level screen being generated by selecting a set of colors that comprise the colors that can be output by that multi-level screen, such that, for a single color, $c_m$ color levels are selected to form an ordered set such that $c_m < c_{m+1}$;

screening unit that screens the input digital medium with the generated multi-level screens using a dither matrix and a set of level matrices; and selecting unit that selects, for each of select number of pixel locations in the input digital medium, one of the level matrices, based on a message symbol to be embedded at that pixel location, to create an output, thereby embedding data in the input digital medium.

5. The apparatus of claim 4, wherein the apparatus comprises a computer, printer, or photocopier.

6. A machine-readable medium having a program of instructions for directing a machine to embed data in an input digital medium, the program of instructions comprising:

generating a set of multi-level screens, each multi-level screen being generated by selecting a set of colors that comprise the colors that can be output by that multi-level screen, such that, for a single color, $c_m$ color levels are selected to form an ordered set such that $c_m < c_{m-1}$;

screening the input digital medium with the generated multi-level screens using a dither matrix and a set of level matrices; and selecting, for each of select number of pixel locations in the input digital medium, one of the level matrices, based on a message symbol to be embedded at that pixel location, to create an output, thereby embedding data in the input digital medium.

* * * * *